US012793116B2

(12) United States Patent
Alizadeh et al.

(10) Patent No.: US 12,793,116 B2
(45) Date of Patent: Nov. 10, 2026

(54) ADAPTIVE RECOMMENDATION SYSTEM FOR GENERATING NEXT BEST SUGGESTIONS THROUGH DYNAMIC REFINEMENT OF INITIAL SEARCH REQUESTS

(71) Applicant: Walmart Apollo, LLC, Bentonville, AR (US)

(72) Inventors: Morteza Alizadeh, Carrollton, TX (US); Neeraj Sharma, Irving, TX (US); Venkata Phani Kumar Boggavarapu, San Ramon, CA (US); Frederick Lee, Plano, TX (US); Yogananda Domlur Seetharama, Mississauga (CA)

(73) Assignee: Walmart Apollo, LLC, Bentonville, AR (US)

( * ) Notice: Subject to any disclaimer, the term of this patent is extended or adjusted under 35 U.S.C. 154(b) by 188 days.

(21) Appl. No.: 18/661,673

(22) Filed: May 12, 2024

(65) Prior Publication Data

US 2025/0348918 A1 Nov. 13, 2025

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0643* (2013.01)

(58) Field of Classification Search
CPC ....................... G06Q 30/0631; G06Q 30/0643
See application file for complete search history.

(56) References Cited

U.S. PATENT DOCUMENTS

| | | | | |
|---|---|---|---|---|
| 10,706,450 | B1 * | 7/2020 | Tavernier ........... | G06Q 30/0625 |
| 11,748,413 | B1 | 9/2023 | Yoon et al. | |
| 2010/0082649 | A1 | 4/2010 | Gutt et al. | |
| 2025/0124483 | A1 * | 4/2025 | Wu ........................ | G06F 16/906 |

OTHER PUBLICATIONS

Gangadharan, Kapilya, et al. "From data to decisions: the transformational power of machine learning in business recommendations." arXiv preprint arXiv:2402.08109 (2024). (Year: 2024).*
Qi, S. et al. "Location aware keyword query suggestion based on document proximity," 2016 IEEE 32nd International Conference on Data Engineering (ICDE), Helsinki, Finland, 2016, pp. 1566-1567.
Uma, N., et al., "Query Recommendation for Search Engine Results Using Machine Learning", Recent Developments in Electronics and Communication Systems KVS Ramachandra Murthy et al., 2023, pp. 7-12.

* cited by examiner

*Primary Examiner* — Anand Loharikar
(74) *Attorney, Agent, or Firm* — Foley IP Law, PLLC

(57) ABSTRACT

Examples provide improved methods for refining an initial search request of a user, as may be performed by a search recommendations system. The system may receive an initial search request via a graphical user interface and identify relevant products for the initial search request. The relevant products for the initial search request may be associated with refinement filters for refining the initial search request. The system may assign scores to the refinement filters based at least on historical search queries of the user or historical interactions of the user. The system may select refinement filter(s) based on the scores assigned to the refinement filters, and display refined search request(s) as user-interactable component(s) on the graphical user interface. The refined search request may be based on refining the initial search request using the selected refinement filter.

9 Claims, 8 Drawing Sheets

ADAPTIVE RECOMMENDATION SYSTEM FOR GENERATING NEXT BEST SUGGESTIONS THROUGH DYNAMIC REFINEMENT OF INITIAL SEARCH REQUESTS

BACKGROUND

In the field of e-commerce, virtual marketplaces are hosted to facilitate online transactions. There are a few features typically provided for the end user to locate a product, such as a search feature and various browsing features. The browsing features typically allow the user to look through items in a database of products offered by the marketplace. The search feature is often implemented with a search bar into which the user enters one or more search terms. The database is searched for products that match the searched term(s) and those matching products are then displayed to the user. The marketplace may also provide a filter feature. The filter feature allows the user to limit products based on some selected criteria, such as a specific brand or category of product.

Upon searching or browsing products, the user may be presented with a list of products containing some information to identify which products they are viewing, such as a picture of the product, a product description, a price, or other such product details. Once a user has found a product of interest, the user can click on the product to direct the user to a product detail page or click an 'add to cart' button to purchase the product.

SUMMARY

Some examples provide a search recommendations system. The system includes at least one processor; and at least one memory comprising computer-readable instructions, the at least one processor, the at least one memory and the computer-readable instructions configured to cause the at least one processor to receive, from a user, an initial search request via a graphical user interface and to identify relevant products for the initial search request. The relevant products for the initial search request may be associated with refinement filters for refining the initial search request. The computer-readable instructions are configured to assign scores to the refinement filters based at least on historical search queries of the user or historical interactions of the user, to select one of the refinement filters based on the scores assigned to the refinement filters, and to display, as a user-interactable component on the graphical user interface, a refined search request based on refining the initial search request using the selected refinement filter. The user-interactable component may be configured to execute the refined search request upon the user interacting with the user-interactable component.

Other examples provide a computer-implemented method for generating search recommendations in response to a user-initiated search. The method includes receiving, from a user, an initial search request via a graphical user interface and identifying relevant products for the initial search request. The relevant products for the initial search request may be associated with refinement filters for refining the initial search request. The method further includes assigning scores to the refinement filters based at least on historical search queries of the user or historical interactions of the user, selecting one of the refinement filters based on the scores assigned to the refinement filters, and displaying, as a user-interactable component on the graphical user interface, a refined search request based on refining the initial search request using the selected refinement filter. The user-interactable component may be configured to execute the refined search request upon the user interacting with the user-interactable component.

Still other examples provide a computer storage medium having computer-executable instructions that, upon execution by a processor of a computer, cause the processor to receive, from a user, an initial search request via a graphical user interface and to identify relevant products for the initial search request. The relevant products for the initial search request may be associated with refinement filters for refining the initial search request. The computer-readable instructions are configured to assign scores to the refinement filters based at least on historical search queries of the user or historical interactions of the user, to select one of the refinement filters based on the scores assigned to the refinement filters, and to display, as a user-interactable component on the graphical user interface, a refined search request based on refining the initial search request using the selected refinement filter. The user-interactable component may be configured to execute the refined search request upon the user interacting with the user-interactable component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
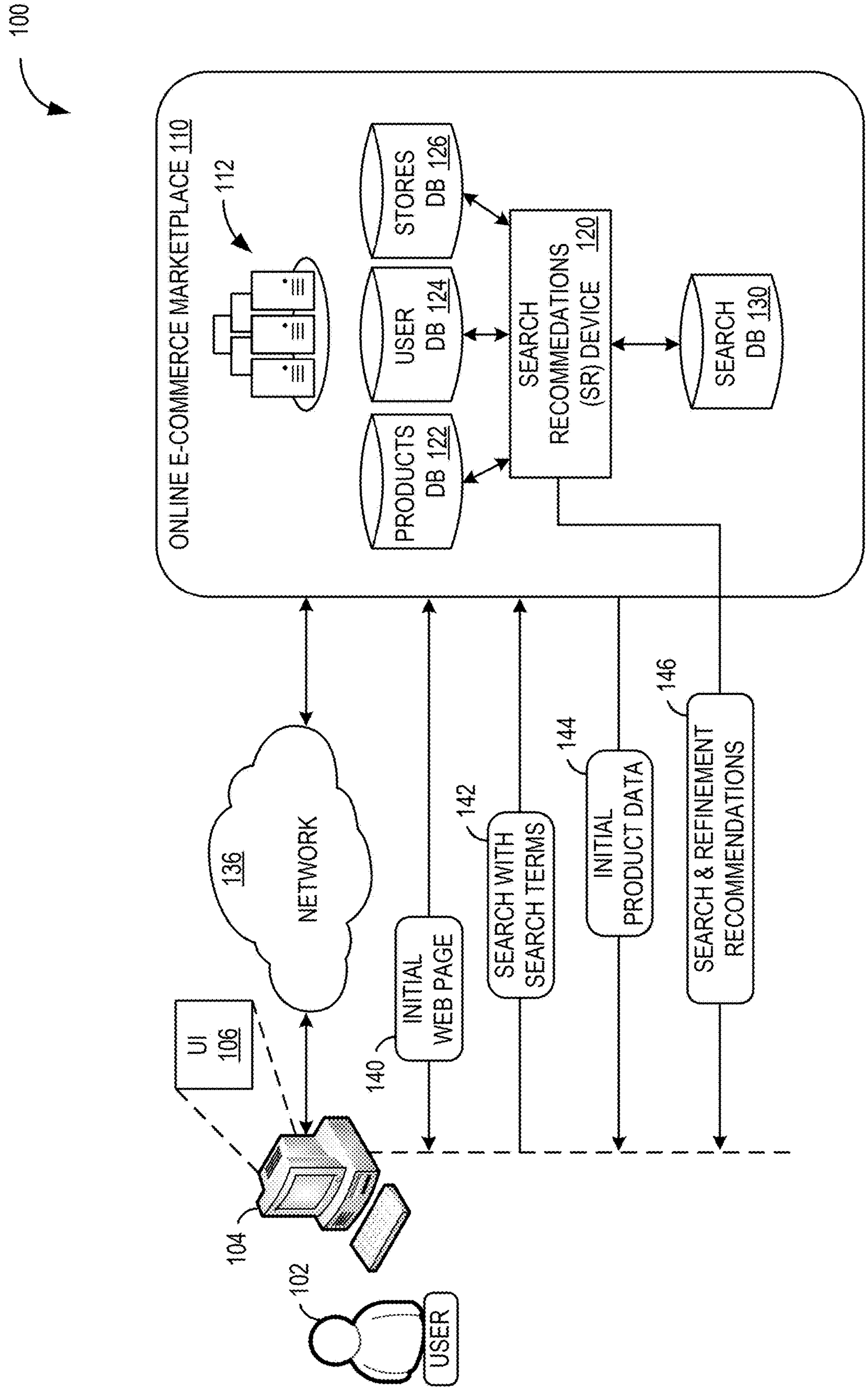
FIG. 1 is an architecture diagram illustrating an exemplary online e-commerce system for providing search recommendations and refinements in an online e-commerce environment.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

One issue users can encounter while searching for products on an online e-commerce marketplaces is that, to find a particular product of interest, the user often has to perform several searches or filters before the desired product is found. For example, some users may not be able to provide quality search terms that can quickly guide the search to the desired product. Further, some users may not know how to use the various filter features that may be provided by the marketplace, or the filter features may be difficult to use. In such situations, the user may perform multiple searches and/or filters in an effort to find the product. Further, in many situations, this oblique search effort may not even result in success, as some searches may fail to find the desired product. Such searches result in extra load on the e-commerce marketplace and supporting infrastructure, as each of the extra search and filter operations cause additional computational processing load and network communications.

An example search recommendations system generates and displays refined search requests in an online e-commerce marketplace. During a user-initiated search, a user inputs an initial search request including one or more initial search terms (e.g., "bread" or "bottled water") into a search field. The marketplace performs an initial query of a products database using the initial search terms and displays the resulting products to the user.

In addition to the search field, the search recommendations system also provides several additional search and refinement features that can assist the user during their online search experience. In examples, the system generates and displays refined search requests and/or search recommendations based on the initial search terms. refined search requests are recommendations that further refine or limit their current search (e.g., further restricting the initial search to a subset of those initial products). Search recommendations are recommendations that cause a different search to be performed (e.g., showing a different set of products). The system displays these refined search requests and/or search recommendations to the user during their initial search (e.g., showing the recommendations as buttons on a recommendations bar somewhere within the web page).

Upon the user clicking on any one of these recommendations buttons, the system updates the web page based on that particular recommendation. More specifically, in the case of refined search requests, the system applies one or more filters to the existing product set to generate a refined product set (e.g., some subset of the already-displayed products). In the case of search recommendations, the system performs a new search using a new set of search terms associated with that particular search recommendation button, thus causing a new set of products to be displayed to the user.

In examples, the search recommendations system implements several ranking methods to determine numerous refinements for various common searches. For example, one common user-initiated search may be for bread (e.g., where "bread" is entered as a search term in a search window). The system computes refined search requests for the "bread" search (e.g., filters such as "sandwich bread" "rolls", or the like), as well as search recommendations for that same "bread" search (e.g., other searches with additional or different search terms, such as "Italian bread", "wheat bread", or the like). These recommendations are determined using machine learning features for query classification and keyword extraction, as well as various factors such as, for example, semantic similarity scores, featured product refinements, user interaction data (e.g., historical search and browse user interactions with the marketplace and the resulting conversion and/or value of those interactions), merchant locations (e.g., potentially different recommendations for different stores), and individual user data (e.g., historical preferences, purchase history, individual user interaction data, preferred store, and the like). As used herein, the term "historical search queries" refer to queries that are captured in logs when users enter q query in a search box of a retailer's website. It should be appreciated that the search session of historical search queries may be further analyzed to determine if users used any refinements to find their target products. Additionally, the term "Users interactions" is used herein to refer to user interactions with a retailer's website, including (but not limited to) a user clicking on a product, adding a product to cart, or purchasing a product. It should be appreciated that refinement filters may help users to better interact (i.e., click, add to cart, purchase) with products, and that user interactions may impact scores assigned to refinement filters. The system uses these factors to score various potential recommendations and to select a particular set of recommendations that are shown to the user.

FIG. 1 is an architecture diagram illustrating an exemplary online e-commerce system (or just "system") 100 for providing search recommendations and refinements in an online e-commerce environment. In an example, a user 102 interacts with an online e-commerce marketplace 110 while searching for products to purchase. During their online shopping experience, the user 102 enters search terms into a search field provided by the marketplace 110, and the marketplace 110 displays a set of products in response to that initial search. However, these initial search results may not include the product(s) desired by the user. As such, the marketplace 110 also provides search and refined search requests for the user 102. These search and refined search requests can improve the search experience or browse experience for the user 102 by helping to guide the search toward the products of interest. It should be appreciated that the term "search experience" is used interchangeably with the term "user historical search experience" and refers to user interactions (e.g., click, add to cart, purchase, etc.) that occur after a user types a query in the search box and interacts with products in the search recall set. Likewise, the term "browse experience" is used interchangeably with the term "user historical browse experience" and refers to user interactions (e.g., click, add to cart, purchase, etc.) that occur after a user browses products on the website. Browsing and searching are differentiated by how a user arrives at a page on the website. In particular, browsing occurs when a user arrives at a particular page on the website by scrolling/clicking over/on hyperlinks associated with product categories, while searching occurs when a user enters a query into a search box. As an example, a user may arrive at a page displaying "milk" products by searching for the term "milk" or by clicking on "Grocery" and then "Dairy" hyperlinks in a "departments" dropdown menu of the website. How a user arrives at a particular product page, particularly preceding or following a user interaction, may correlate to a user's propensity to purchase a product. For instance, users typing "milk" may be significantly more likely to buy milk than users browsing to the "dairy" department of a website.

Persons of ordinary skill in the art (POSITAs) will appreciate how the above-described nuances of e-commerce search engines materially impact the performance of a given search engine.

In the example, the user 102 interacts with the marketplace 110 via a user computing device 104 (e.g., a desktop computer, laptop, tablet, mobile device, or the like). The marketplace 110 may be executed on any computing architecture 112 sufficient to enable the systems and methods described herein, such as a cloud architecture, client/server architecture, or the like. The marketplace 110 provides a user interface (UI) 106 for the user 102, such as via a website (e.g., via hypertext transfer protocol (HTTP) and hypertext markup language (HTML) content) or via a mobile app, and over a network 136 such as the Internet. During an online shopping experience, the marketplace 110 provides an initial web page 140 in which the user 102 utilizes the UI 106 to search for products or services they wish to purchase. For example, the web page 140 may provide a search field into which the user 102 can input one or more search terms. Upon submission of this search 142 with search terms, the search 142 is received and processed by the marketplace 110, returning an initial set of products (e.g., initial product data 144) for display to the user 102.

In addition, the marketplace 110 also identifies a set of search and refined search requests 146 that are also displayed to the user 102 along with the initial search results. These recommendations are generated by a component of the marketplace 110, namely a search recommendations (SR) device 120. In this example, the SR device 120 accesses a search database (DB) 130 that stores both search recommendations and refined search requests that are predetermined for common searches (e.g., for the 1,000 most popular historic searches performed on the marketplace 110). Recommendations stored by the SR device 120 may also be based on aspects of user data (e.g., user interaction data, individual user data stored in a user DB 124) or aspects of store data (e.g., product performance at particular merchant locations stored in a stores DB 126). If the received search 142 matches an existing entry in the search DB 130 (e.g., there are recommendations available for those particular search terms), then the SR device 120 provides those particular recommendations as the search and refined search requests 146. If the search does not match an existing entry in the search DB 130, the SR device 120 does not provide any recommendations, in some examples. In other examples, if the search does not match an existing entry in the search DB 130, the SR device 120 dynamically determines the search and refined search requests based on the search terms provided in the search 142.

Figure 2:
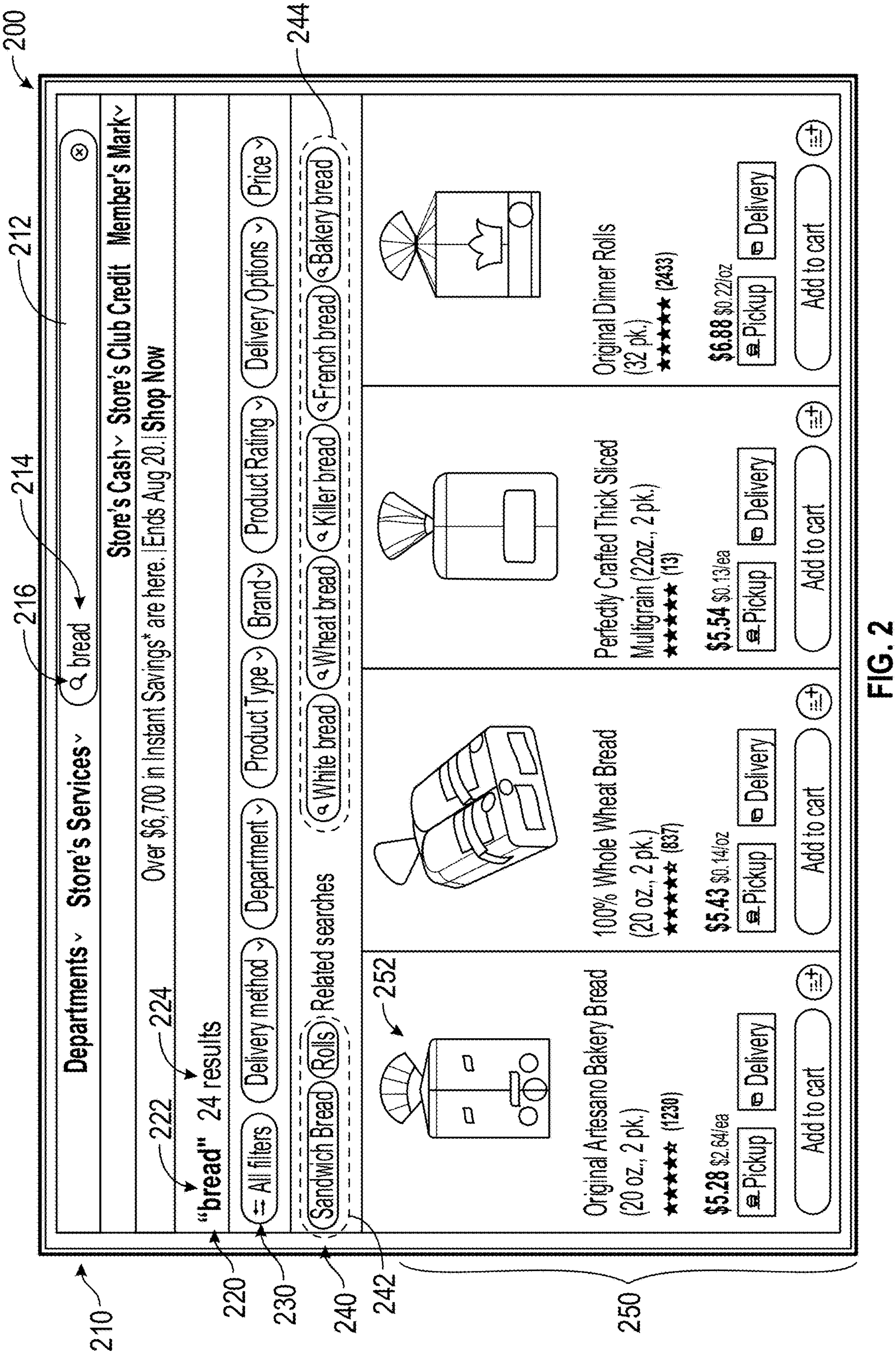
FIG. 2 is a diagram illustrating an exemplary user interface (UI) for providing search results, recommendations, and refinements in an online e-commerce environment such as the e-commerce system shown in FIG. 1.

Refined search requests are recommendations that further refine or limit the current search 142 of the user 102. Each refinement recommendation includes a set of one or more filters that, upon activation, further restrict the initial product data 144 shown to the user 102. Search recommendations are recommendations that cause a different search to be performed (e.g.,). Each search recommendation includes a set of search terms that, upon activation, cause another search to be performed (e.g., a search distinct from the search 142 initially performed by the user 102, and perhaps showing a different set of products). These search and refined search requests 146 are displayed via the UI 106 (e.g., along with the initial product data 144) as buttons on a recommendations bar somewhere within the web page. FIG. 2 illustrates an example UI 106 that includes the refined search requests 146.

As such, when the user 102 clicks on one of the refined search requests buttons provided in the recommendations stored by the SR device 120, the marketplace 110 filters the product set shown in the initial product data 144 to a subset of those products (e.g., applying the filter(s) identified in the refinement recommendation). When the user 102 clicks on one of the search recommendations buttons provided in the recommendations stored by the SR device 120, the marketplace 110 performs a new search of the products DB 122, thus replacing the initial product data 144 with the results of the new search. These recommendations are automatically selected by the SR device 120 to be the most likely recommendations to assist the user 102 to arrive that their products of interest based on various considerations and rankings performed by the system 100. FIG. 2 provides additional user interface details (e.g., of UI 106) in which the user 102 submits user searches 142 through the marketplace 110, during which the search and refined search requests 146 are generated by the SR device 120 and displayed in the user interface.

FIG. 2 is a diagram illustrating an exemplary user interface (UI) 200 for providing search results, recommendations, and refinements in an online e-commerce environment such as the e-commerce system 100 shown in FIG. 1. In some examples, the UI 200 is similar to the UI 106 shown in FIG. 1. In the example shown in FIG. 2, the UI 200 is shown as HTML content as displayed to the user 102 via their user computing device 104 (e.g., through a web browser, or the like). Further, it is presumed that UI 200 is what is displayed after the initial web page 140, search 142 with search terms, initial product data 144, and search & refinement recommendations are performed as shown in FIG. 1. As such, the UI 200 shows one example result of what is produced by the marketplace 110 and what is shown to the user 102 after one example search. While this example is shown as HTML content, it should be understood that any content delivery method may be used that allows the systems and methods described herein. Further, any or all of the content shown in UI 200 may be provided by the SR device 120, products DB 122, or any other component of the system 100.

In the example shown in FIG. 2, the user 102 enters a search 142 into a search field 212 provided by the marketplace 110 (e.g., in a header row along the top of the UI 200). The search field 212 allows the user 102 to input search terms 214 into the search field 212. The search field 212 may be provided to the user 102 within the initial web page 140. In this example, the user enters the search term “bread” into the search field 212 and submits a search for products related to bread (e.g., by clicking a search button 216, by pressing enter after inputting the terms into the search field 212, or the like). It should be understood that many of the other components shown in FIG. 2 are displayed as a result of the submission of this user search.

More specifically, and in response to this example user-initiated search submission, the marketplace 110 receives the search 142 and performs a product query from the products DB 122 (e.g., searching for products related to “bread”). In this example search, the UI displays a search summary row 220 that identifies current search terms 222 being used during the current search (e.g., “bread”), as well as a results count 224 identifying how many products were found during the query. In this example, the query performed by the marketplace 110 identifies 24 products, as shown by the results count 224.

Further, as a part of this query, the marketplace 110 also retrieves some product data for each of the products. More specifically, the UI 200 displays the product data for each product in the search result section 250. This search results section 250 includes a product card 252 for each product that match the current search term 222 (e.g., the 24 products of the initial query results). Each product card 252 displays information about the listed product, such as a product image, a product name, a product short description, a product rating, a product price, and the like. Further, each product card 252 may also include interactive elements (e.g., buttons, interactive images, or the like) that allow the user 102 to perform additional functionality associated with that particular product, such as viewing additional details about the product (e.g., via clicking the product image) or adding that product to their cart (e.g., via clicking an "add to card" button). In this example, only four individual products are shown here, but it should be understood that additional product cards 252 may be provided off-screen below.

Further, the UI 200 also includes a static filters row 230. This static filters row 230 provides multiple filter drop-down buttons (e.g., "Delivery method", "Department", "Product Type", and so forth), each of which allows the user 102 to refine this search through application of one or more pre-determined filters in one or more pre-determined filter categories.

Additionally, to better aid the user 102 in their search experience, the UI 200 also provides a recommendation bar 240. The recommendations bar 240 provides particular search recommendations that are dynamically determined by the marketplace 110 in response to this particular search 142. In the example, the recommendations bar 240 provides both refined search request(s) 242 and search recommendations 244. As used herein, the term "refined search request (s)" is used interchangeably with "refinement recommendation(s)." Refined search request(s) 242 represent particular filters that are recommended to help the user 102 refine their existing search (e.g., narrow down the 24 existing products to some subset of products). Search recommendations 244 represent new searches that are recommended to help the user 102 to generate a new search (e.g., generate a new set of products that may be more pertinent or specific to what the user 102 may be looking for).

In the example shown here, two refined search request(s) 242 (e.g., "Sandwich Bread" and "Rolls") and five search recommendations 244 (e.g., "White bread", "Wheat bread", "Dave's killer bread", "French bread", "Bakery bread") are shown as a result of this initial search. Each of the individual recommendations in the recommendations bar 240 is displayed in the UI 200 as a user-interactable button that, upon activation by the user 102, either perform a refinement to the existing search (e.g., apply one or more filters) or perform a new search (e.g., perform a new search query using different search terms), respectively.

The user 102 may click on one of the refined search request(s) 242 to narrow down the current search count, thus allowing for the user 102 to see products that better match what they are looking for. For example, if the user 102 were searching for a selection of rolls or sandwich bread, they could click on one of these refined search request(s) 242 to add some recommended filter to the search (e.g., limiting the type of products shown in the search results section 250).

Alternatively, the user 102 may click on one of the search recommendations (or "related searches") 244, thus causing a different search to be performed (e.g., ideally showing products more related to what they are looking for). For example, if the user 102 is searching for some particular manufacturer's French bread, they could click on the "French Bread" recommendation 244, thus causing a new search to be performed (e.g., with the search terms "French bread"), and the search results section 250 to be recreated with those resulting products (e.g., French breads from various merchants). In either case, the recommendations 244 provided on the recommendations bar 240 can give the user 102 two different methods of helping to direct their search efforts.

The recommendations 244 provided on the recommendations bar 240 are dynamically determined by the marketplace 110 (e.g., by the SR device 120) based on the current search. More specifically, these recommendations 244 are determined and selected for inclusion in the recommendations bar 240 based on the current search terms as well as potentially various other factors, such as semantic similarity scores, featured product refinements, user interaction data (e.g., historical search and browse user interactions with the marketplace and the resulting conversion and/or value of those interactions), merchant locations (e.g., potentially different recommendations for different stores), and individual user data (e.g., historical preferences, purchase history, individual user interaction data, preferred store, and the like). The SR device 120 may use these factors to score various potential recommendations 244 and to select a particular set of recommendations that are shown to the user 102 on the UI 200.

Figure 3:
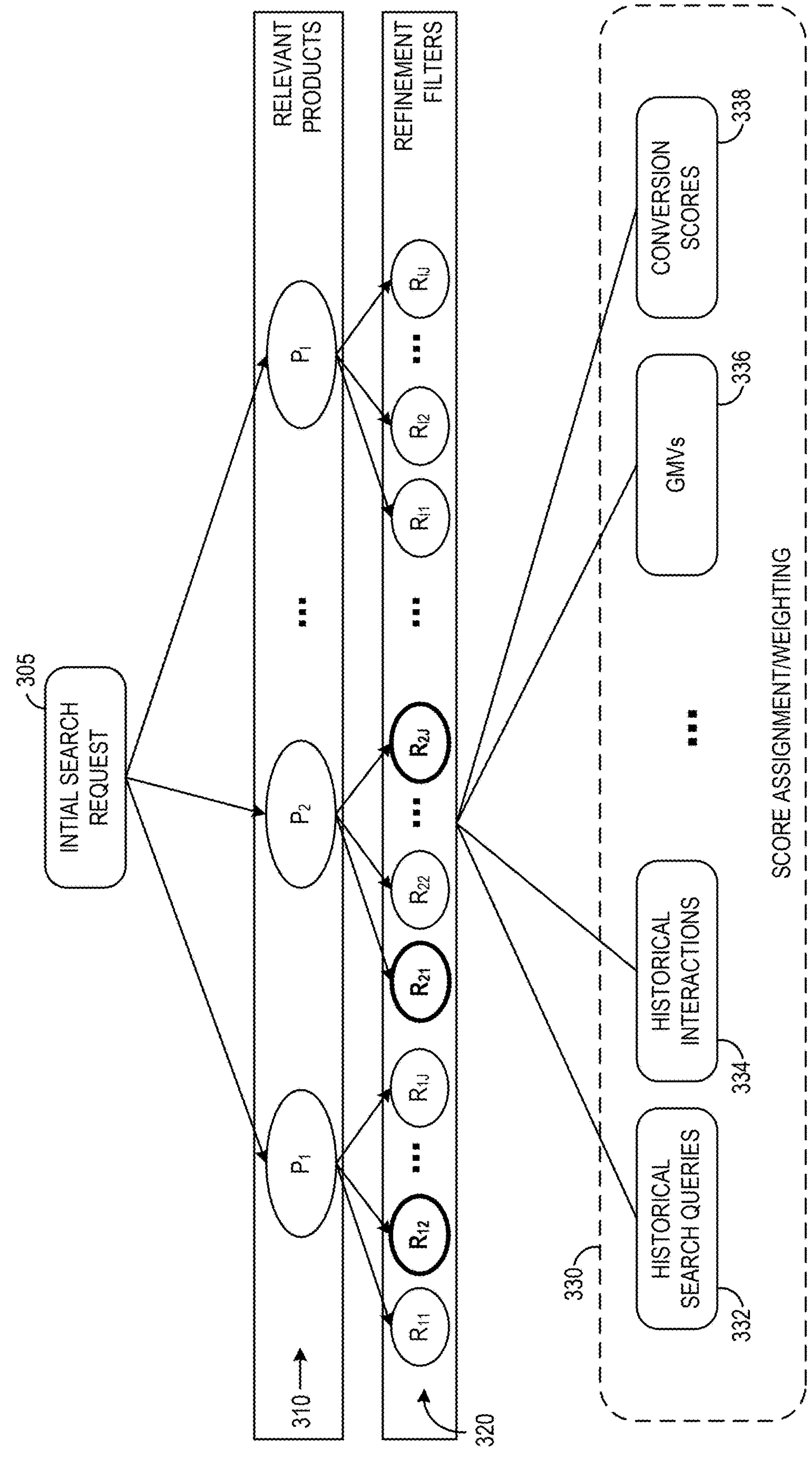
FIG. 3 is a data flow diagram illustrating a process for generating refinement filters for refining an initial search request of a user.

FIG. 3 is a data flow diagram 300 illustrating a process for generating refinement filters for refining an initial search request 305. As used herein, the term "refinement filter" refers to a filter used to refine a current recall set generated for a user search query based on suggested values. In some examples, the operations shown and described in relation to FIGS. 3-6 are performed by the SR device 120, and the initial search request 305 may include user input terms (e.g., "bread", etc.) and the operations/processes discussed in relation to FIGS. 3-6 may be performed by the SR device 120. A search term of the initial search request 305 may appear in the title and/or the short description of various relevant products 310. It should be appreciated that "relevant products" include individual products and/or product categories that are relevant to the user's initial search request. The relevant products 310 may be associated with, or otherwise used to generate, refinement filters 320. Scores may be assigned to refinement filters 320 based on various score assignment/weighting criteria 330, including historical search queries of a user 332, historical interactions of a user 324, gross merchandises values (GMVs) of relevant products associated with the initial search request, and/or conversion scores of relevant products associated with the initial search request. It should be appreciated that conversion scores of relevant products may be based on whether the relevant products were purchased by the user in response to a given event (e.g., in response to historical search queries of a user and/or historical interactions of the user). It should further be appreciated that the score assignment/weighting criteria 330 may be metrics specific to a particular merchant location and/or weighted based on a decay function with respect to a length of time that has passed since a given event (e.g., since historical search queries of the user and/or the historical interactions of the user).

Initial search requests (e.g., "bread") may be used to identify one or more relevant products based on a Bidirectional Encoder Representations from Transformers (BERT) language model that is trained to classify natural language inputs (e.g., the natural language-based search terms of initial search request 305). A dataset of relevant product(s) may be generated using various criteria, e.g., historical search queries of the user, historical interactions of the user, etc. The dataset of relevant product(s) may be used to train a classifier model to assign scores to refinement filters and/or weight scores assigned to refinement filters. Refinement filter(s) may then be selected based on the assigned scores. Selected refinement filter(s) may then be used to refine the initial search request into a refinement search request. Thereafter, the refined search request may be displayed as a user-interactable component on a graphical user interface, which may be configured to execute the refined search request upon the user interacting with the user-interactable component.

It should be appreciated that product titles and short descriptions may be processed to remove special characters, stop words, extra hyphens, space, and the like. A set of customized part-of-speech (POS) tagging patterns may be used to extract keywords that follow these patterns. For example, a pattern may include "[noun][noun]", "[adjective][adjective]", "[adjective][noun]", "[noun][adjective]" and so on. Data may be vectorized using a vectorizer, such as a KeyphraseCountVectorizer or a similar vectorizer for example. The vectorizer may be initialized using POS patterns and list of stop words as input parameters. The inputs of this vectorization may be used to extract the top n key phrases and their semantic scores.

Figure 4:
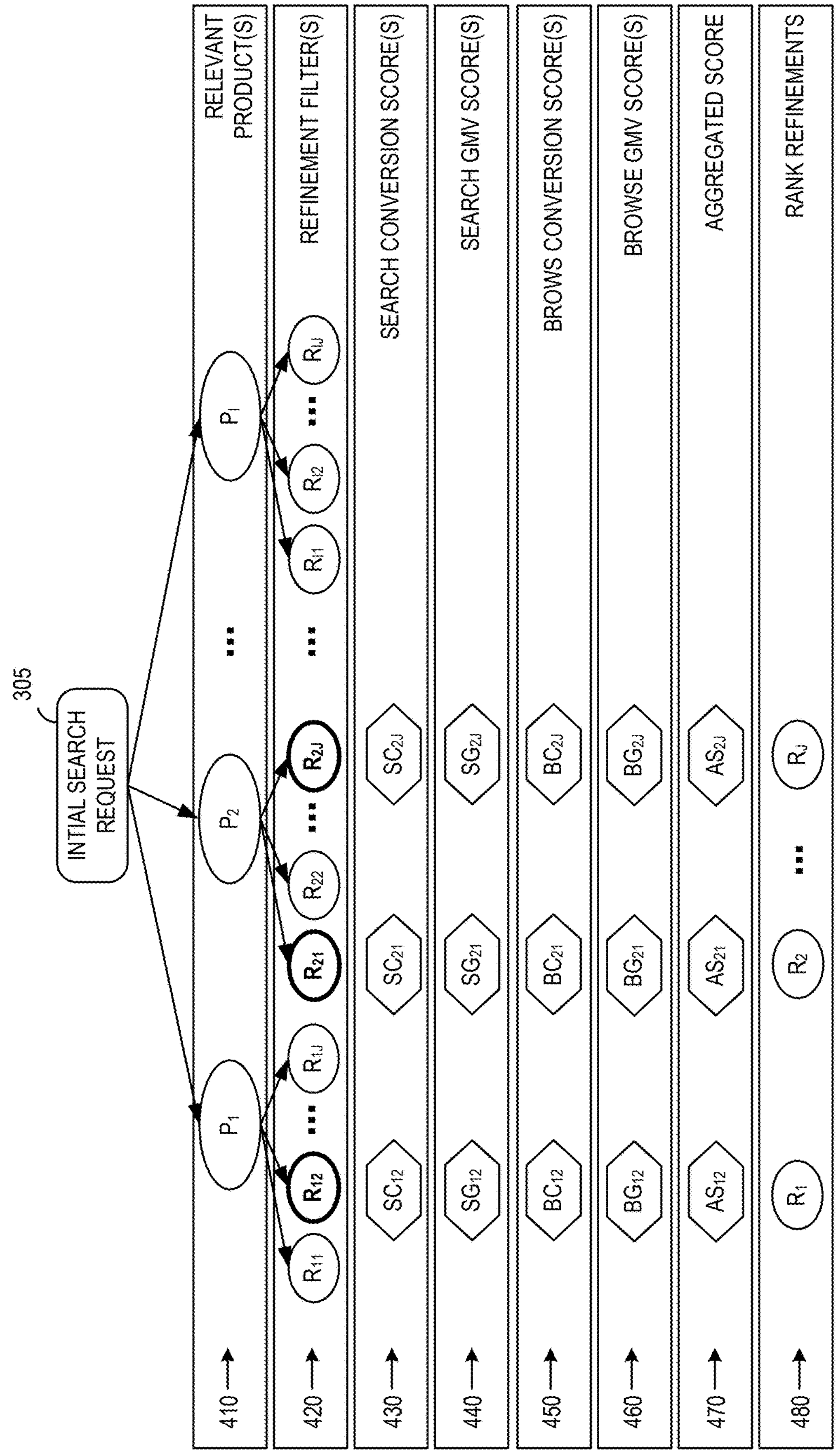
FIG. 4 is another data flow diagram illustrating additional computational for refining an initial search request of a user.

FIG. 4 is another data flow diagram illustrating additional computational for refining an initial search request 305 of a user. As shown, the initial search request 305 is used to identify relevant products 410 (e.g., $P_i$), which are then used to identify refinement filters 420 (e.g., $R_{ij}$). Search conversion scores 430 (e.g., $SC_{ij}$), search GMV scores 440 (e.g., $SG_{ij}$), browse conversion scores 450, and browse GMV scores 460 are then assigned to the refinement filters 420, and based on the assigned scores, aggregated scores 470 (e.g., $AS_{ij}$) are computed for the refinement filters 420. The refinement filters are then ranked based on the aggregated scores 470, and a subset of the resulting ranked refinement filter(s) 480 (e.g., $R_1$, etc.) are displayed via the graphical user interface.

Figure 5:
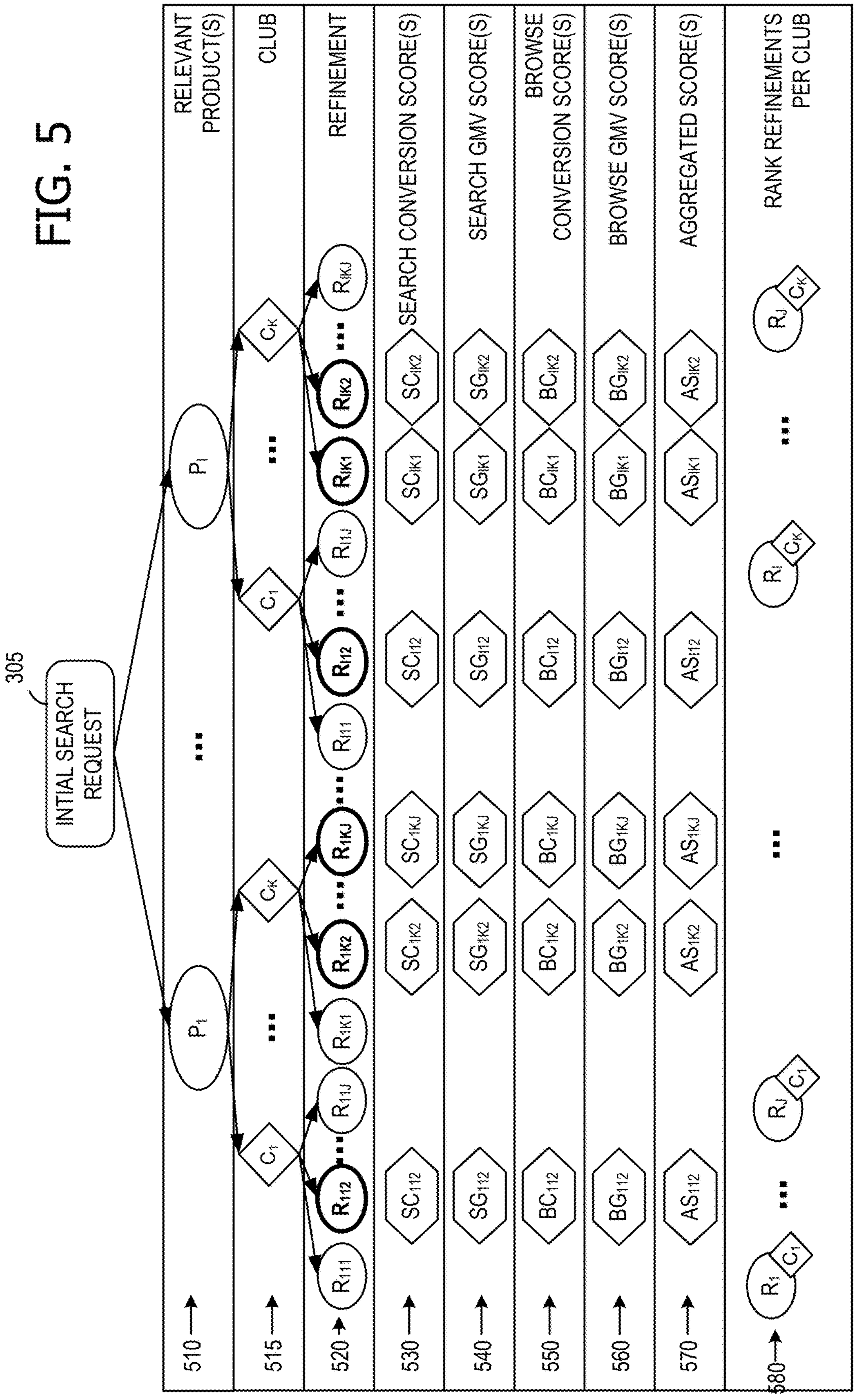
FIG. 5 is yet another data flow diagram illustrating additional computational for refining an initial search request of a user.

In some embodiments, store-specific databases (DBs) (also referred to as club-specific DBs) may be used to identify and/or assign scores to refinement filter(s). It should be appreciated that the terms "club-specific" and "store-specific" are used interchangeably herein to refer to a specific location (e.g., retail store, club, etc.) associated with a user and that users may be associated with one or more locations. FIG. 5 is yet another data flow diagram illustrating additional computational for refining an initial search request 305 of a user. As shown, the initial search request 305 is used to identify relevant products 510 (e.g., $P_i$). Club-specific DBs 515 (e.g., $C_k$) are then accessed and used to identify club-specific refinement filters 520 (e.g., $R_{ikj}$). Search conversion scores 530 (e.g., $SC_{ij}$), search GMV scores 540 (e.g., $SG_{ij}$), browse conversion scores 550, and browse GMV scores 560 are then assigned to the club-specific refinement filters 520, and based on the assigned scores, aggregated scores 570 (e.g., $AS_{ij}$) are computed for the club-specific refinement filters 520. The club-specific refinement filters are then ranked based on the aggregated scores 570, and a subset of the resulting ranked club-specific refinement filter(s) 580 (e.g., $R_1$, $C_1$, etc.) are displayed via the graphical user interface.

Figure 6:
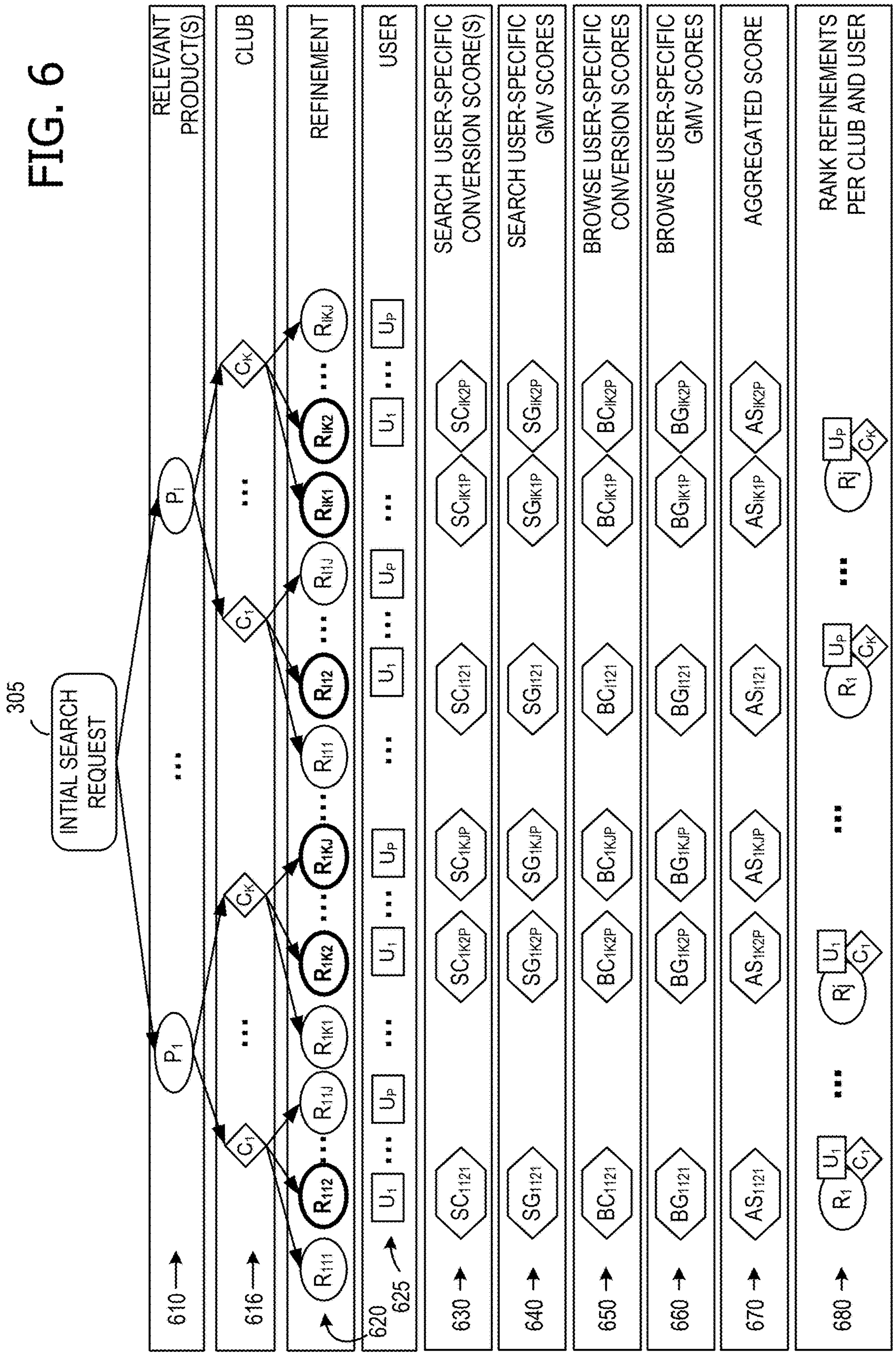
FIG. 6 is a data flow diagram illustrating additional computational steps for refining an initial search request of a user.

In some embodiments, user-specific DBs may be used to identify and/or assign scores to refinement filter(s). FIG. 6 is yet another data flow diagram illustrating additional computational steps for refining an initial search request of a user. As shown, the initial search request 305 is used to identify relevant products 610 (e.g., $P_i$). Club-specific DBs 615 (e.g., $S_k$) are then accessed and used to identify refinement filters 620 (e.g., $R_{ikj}$). User-specific DBs 625 (e.g., $U_p$) are then accessed and used to assign search conversion scores 630 (e.g., $SC_{ij}$), search GMV scores 640 (e.g., $SG_{ij}$), browse conversion scores 650, and browse GMV scores 660 to the club-specific refinement filters 620. Based on the assigned scores, aggregated scores 670 (e.g., $AS_{ij}$) are computed for the club-specific refinement filters 620. The club-specific refinement filters are then ranked based on the aggregated scores 670, and a subset of the resulting ranked club-specific refinement filter(s) 680 (e.g., $R_1$, $C_1$, $U_1$, etc.) are displayed via the graphical user interface.

Figure 7:
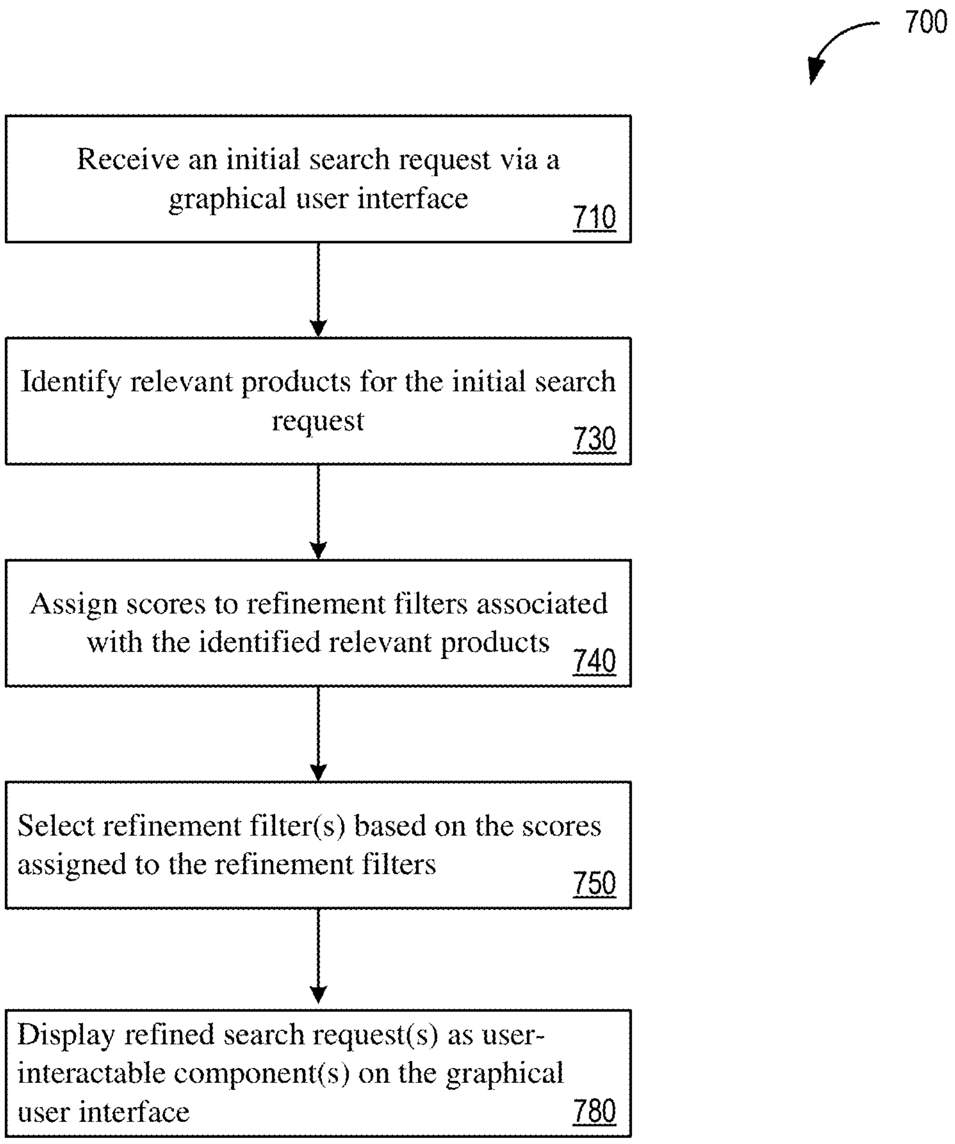
FIG. 7 is a flow chart of an example method for refining an initial search request of a user.

FIG. 7 is a flow chart of an example method 700 for refining an initial search request of a user, as may be performed by a search recommendations system. At step 710, the system receives an initial search request via a graphical user interface. At step 720, the system identifies relevant products for the initial search request. The relevant products for the initial search request are associated with refinement filters for refining the initial search request. At step 730, the system assigns scores to the refinement filters based at least on historical search queries of the user or historical interactions of the user. At step 750, the system selects refinement filter(s) based on the scores assigned to the refinement filters. At step 760, the system displays refined search request(s) as user-interactable component(s) on the graphical user interface. The refined search request is generated from refining the initial search request using the selected refinement filter. The user-interactable component (s) may be configured to execute the refined search request upon the user interacting with the user-interactable component.

Exemplary Operating Environment

Figure 8:
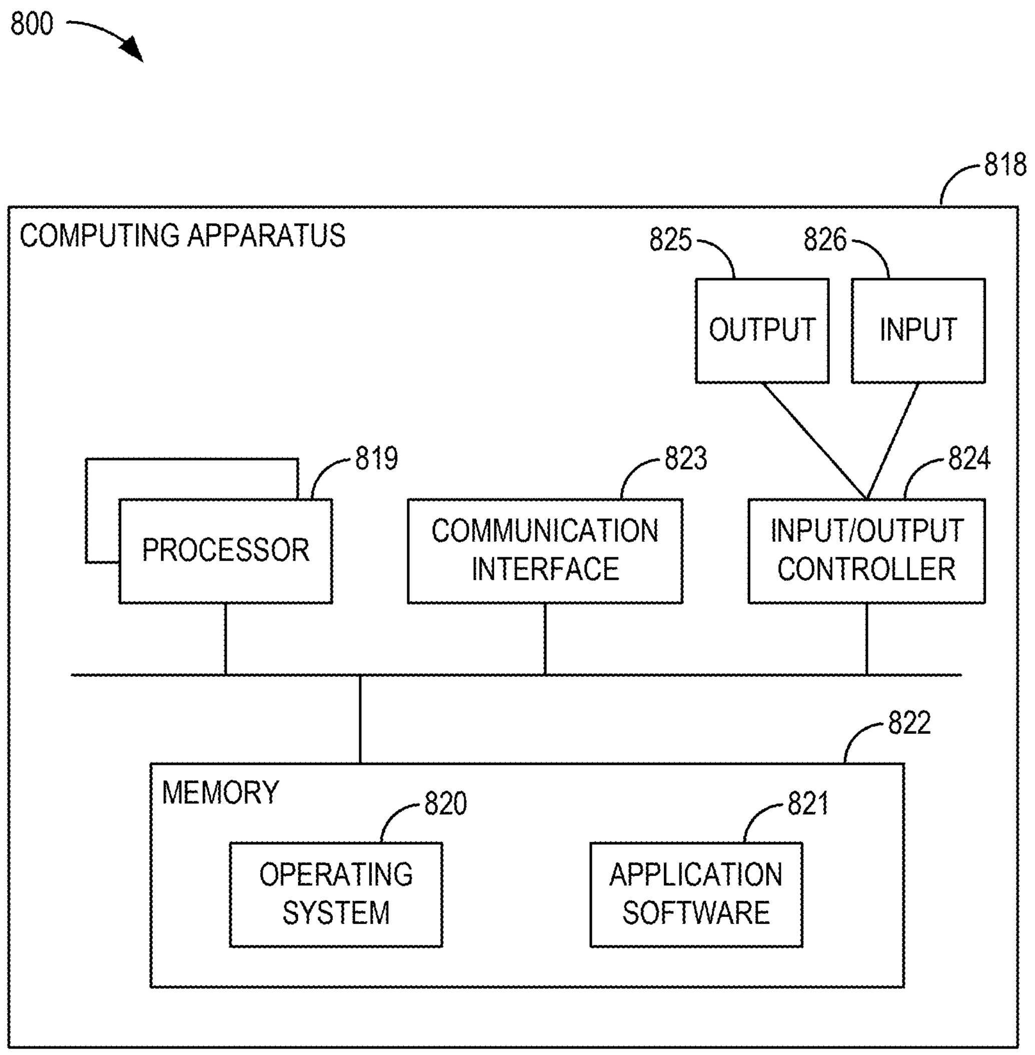
FIG. 8 illustrates a computing apparatus according to an embodiment as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 is a computing device, such as, but not limited to, the device 120, devices that are a part of computing architecture 112, and user computing device 104 of FIG. 1.

The computing apparatus 818 comprises one or more processors 819 which can be microprocessors, controllers, or any other suitable type of processors for processing computer executable instructions to control the operation of the electronic device. Alternatively, or in addition, the processor 819 is any technology capable of executing logic or instructions, such as a hardcoded machine. In some examples, platform software comprising an operating system 820 or any other suitable platform software is provided on the apparatus 818 to enable application software 821 to be executed on the device.

In some examples, computer executable instructions are provided using any computer-readable medium or media accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 in other examples outputs data to devices other than the output device, e.g., a locally connected printing device. In some examples, a user provides input to the input device(s) 826 and/or receives output from the output device(s) 825.

The functionality described herein can be performed, at least in part, by one or more hardware logic components. The computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a first search request, the first search request including one or more search terms; identifying one or more product categories as output from a machine learning classification model in response to inputting of the one or more search terms; identifying a first plurality of products that are assigned to the one or more product categories, each product of the first plurality of products including a plurality of product titles and a plurality of product short descriptions in a natural language; applying the plurality of product titles and the plurality of product short descriptions as input to a second machine learning model that is configured to generate a plurality of recommended searches, each recommended search of the plurality of recommended searches including at least one search term; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

At least a portion of the functionality of the various elements in FIG. 1 to FIG. 7 can be performed by other elements in FIG. 1 to FIG. 7, or an entity (e.g., processor, web service, server, application program, computing device, etc.) not shown in FIG. 1 to FIG. 7.

In some examples, the operations illustrated in FIG. 1 and FIG. 3 to FIG. 7 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for search recommendations, the system comprising:

at least one processor; and at least one memory storing programming instructions that, upon execution by the at least one processor, cause the at least one processor to:

train a machine learning model to weight refinement filter scores based on historical search queries of a user on a retail website and historical interactions of the user with the retail website, wherein the historical search queries of the user reflect past search requests of the user on the retail website, and wherein the historical interactions of the user reflect past interactions of the user with the retail website including interactions when the user clicked on products, added the products to a shopping cart, or purchased the products;

receive, from the user, an initial search request via a graphical user interface of the retail website;

identify relevant products for the initial search request, the relevant products for the initial search request associated with different refinement filters for refining the initial search request;

assign scores to the refinement filters based at least on the historical search queries of the user and the historical interactions of the user;

weight, by the trained machine learning model, the scores assigned to the refinement filters based on conversion scores and decay functions, wherein the conversion scores attribute heavier weights when the relevant products were purchased by the user responsive to the past interactions or the past search requests, and wherein the decay functions attribute heavier weights to more recent interactions and search requests reflected in the historical search queries of the user and the historical interactions of the user;

select one of the refinement filters based on the weighted scores assigned to the refinement filters, wherein the selected refinement filter is assigned a higher weighted score than the other refinement filters; and display, as a user-interactable component on the graphical user interface, a refined search request based on refining the initial search request using the selected refinement filter, wherein the user-interactable component is configured to execute the refined search request upon the user interacting with the user-interactable component.

2. The system of claim 1, wherein the scores assigned to the refinement filters are weighted based on gross merchandises values (GMVs) of the relevant products associated with the initial search request.

3. The system of claim 1, wherein the scores are assigned to the refinement filters are based on metrics specific to a particular merchant location.

4. A method comprising:

training a machine learning model to weight refinement filter scores based on historical search queries of a user on a retail website and historical interactions of the user with the retail website, wherein the historical search queries of the user reflect past search requests of the user on the retail website, and wherein the historical interactions of the user reflect past interactions of the user with the retail website including interactions when the user clicked on products, added the products to a shopping cart, or purchased the products;

receiving, from the user, an initial search request via a graphical user interface of the retail website;

identifying relevant products for the initial search request, the relevant products for the initial search request associated with different refinement filters for refining the initial search request;

assigning, by the processor, scores to the refinement filters based at least on the historical search queries of the user and the historical interactions of the user;

weighting, by the trained machine learning model, the scores assigned to the refinement filters based on conversion scores and decay functions, wherein the conversion scores attribute heavier weights when the relevant products were purchased by the user responsive to the past interactions or the past search requests, and wherein the decay functions attribute heavier weights to more recent interactions and search requests reflected in the historical search queries of the user and the historical interactions of the user;

selecting, by the processor, one of the refinement filters based on the weighted scores assigned to the refinement filters, wherein the selected refinement filter is assigned a higher weighted score than the other refinement filters; and displaying, by the processor as a user-interactable component on the graphical user interface, a refined search request based on refining the initial search request using the selected refinement filter, wherein the user-interactable component is configured to execute the refined search request upon the user interacting with the user-interactable component.

5. The method of claim 4, wherein the scores assigned to the refinement filters are weighted based on gross merchandises values (GMVs) of the relevant products associated with the initial search request.

6. The method of claim 4, wherein the scores are assigned to the refinement filters are based on metrics specific to a particular merchant location.

7. A computer program product storing programming instructions that, upon execution by a processor, cause the processor to:

train a machine learning model to weight refinement filter scores based on historical search queries or a user on a retail website and historical interactions of the user with the retail website, wherein the historical search queries of the user reflect past search requests of the user on the retail website, and wherein the historical interactions of the user reflect past interactions of the user with the retail website including interactions when the user clicked on products, added the products to a shopping cart, or purchased the products;

receive, from the user, an initial search request via a graphical user interface of the retail website;

identify relevant products for the initial search request, the relevant products for the initial search request associated with different refinement filters for refining the initial search request;

assign scores to the refinement filters based at least on the historical search queries of the user and the historical interactions of the user;

weight, by the trained machine learning model, the scores assigned to the refinement filters based on conversion scores and decay functions, wherein the conversion scores attribute heavier weights when the relevant products were purchased by the user responsive to the past interactions or the past search requests, and wherein the decay functions attribute heavier weights to more recent interactions and search requests reflected in the historical search queries of the user and the historical interactions of the user;

select one of the refinement filters based on the weighted scores assigned to the refinement filters, wherein the selected refinement filter is assigned a higher weighted score than the other refinement filters; and display, as a user-interactable component on the graphical user interface, a refined search request based on refining the initial search request using the selected refinement filter, wherein the user-interactable component is configured to execute the refined search request upon the user interacting with the user-interactable component.

8. The computer program product of claim 7, wherein the scores assigned to the refinement filters are weighted based on gross merchandises values (GMVs) of the relevant products associated with the initial search request.

9. The computer program product of claim 7, wherein the scores are assigned to the refinement filters are based on metrics specific to a particular merchant location.

* * * * *